(12) United States Patent
Lipp

(10) Patent No.: US 6,672,754 B2
(45) Date of Patent: Jan. 6, 2004

(54) DEVICE FOR MANUFACTURING CHEWING GUM

(75) Inventor: Eberhard Lipp, Altrip (DE)

(73) Assignee: Lipp Mischtechnik GmbH, Mannheim (DE)

(*) Notice: Subject to any disclaimer, the term of this patent is extended or adjusted under 35 U.S.C. 154(b) by 0 days.

(21) Appl. No.: 09/849,821

(22) Filed: May 4, 2001

(65) Prior Publication Data

US 2001/0050879 A1 Dec. 13, 2001

(30) Foreign Application Priority Data

Mar. 18, 2000 (DE) .......................... 100 24 122

(51) Int. Cl.[7] ................................. B01F 7/00
(52) U.S. Cl. .................... 366/97; 366/144; 366/303; 366/307
(58) Field of Search .................. 366/97, 303, 307, 366/144, 82, 315, 316, 317

(56) References Cited

U.S. PATENT DOCUMENTS

| | | | |
|---|---|---|---|
| 1,487,208 A | * 3/1924 | Cooke et al. | |
| 1,711,154 A | * 4/1929 | Michal | |
| 2,851,256 A | * 9/1958 | Andreopoulos et al. | |
| 2,969,960 A | * 1/1961 | Gurley, Jr. | |
| 3,733,059 A | * 5/1973 | Pettit | 366/79 |
| 4,330,215 A | * 5/1982 | Gale | 366/303 |
| 4,408,887 A | * 10/1983 | Yamaoka | 366/82 |
| 4,976,547 A | * 12/1990 | Hisanaga et al. | 366/303 |
| 5,225,210 A | * 7/1993 | Shimoda | 366/76.6 |
| 5,259,670 A | * 11/1993 | Brown | 366/97 |
| 5,320,796 A | * 6/1994 | Harashima et al. | 366/82 |
| 5,358,329 A | * 10/1994 | Plache et al. | 366/97 |
| 5,450,368 A | * 9/1995 | Kubota | 366/303 |
| 5,836,689 A | * 11/1998 | Wieland | 366/303 |
| 5,879,722 A | * 3/1999 | Andersen et al. | 425/208 |
| 6,074,084 A | * 6/2000 | Kolossow | 366/144 |
| 6,267,847 B1 | * 7/2001 | Doelle et al. | 366/303 |

FOREIGN PATENT DOCUMENTS

| | | |
|---|---|---|
| EP | 0 160 726 | 11/1985 |
| EP | 0 732 056 | 9/1996 |
| EP | 0 732 059 | 9/1996 |
| EP | 0 763 329 | 3/1997 |

OTHER PUBLICATIONS

Rent, Karl–Heinz, "Extrusion:does chewing gum pass the taste test?", Food Manufacture, Sep.1987, pp.47–50.

* cited by examiner

Primary Examiner—Tony G. Soohoo
(74) Attorney, Agent, or Firm—Harrison & Egbert

(57) ABSTRACT

A device for making chewing gum with a mixer, in which gum base is kneaded and mixed with sugar and liquid components, such as glucose flavoring and/or coloring agents. Whereas this has been done until now using mixers that operate essentially in batches, now it is proposed according to the invention to use as a mixer a high-speed shearing mixer that is flowed through in the axial direction, in which many ring-shaped stator parts are arranged projecting radially to the inside on the inner wall of an essentially cylinder-shaped housing, with which the radial outside ends of circumferential mixing blades mesh to form grinding gaps. This device has the advantage that it is small, cost-effective and continuously productive.

11 Claims, 2 Drawing Sheets

DEVICE FOR MANUFACTURING CHEWING GUM

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention involves a device for making chewing gum with a mixer, in which chewing gum base material, so called "gum base" is kneaded and mixed with flavoring and/or coloring agents, and/or other compounds.

BACKGROUND OF THE INVENTION

Devices of this type are known in the prior-art. Usually they involve mixers that cut and mix the gum base and the correspondingly weighed in components with Z-arm kneaders for approx. 20 to 30 minutes. The temperature of the kneaded mixture is kept at approx. 45 to 50° C. in the process, by a preliminary heating of the mixer casing. Only at the end of the process are the flavoring agents added to get the chewing gum material.

The chewing gum material is then supplied in batches to the forming extruders, and then it is cooled, shaped and packaged.

These described devices have a series of disadvantages: on the one hand, because of the long mixing times, large and thus accordingly expensive kneading machines are necessary in order ensure a certain output rate. This also causes a high spatial requirement for the equipment, and simultaneously high investments.

In addition, the gum base as well as chewing gum material are very sticky and thus can only be incompletely emptied from these prior-art mixers without manual operation. This leads not only to product entrainments from one batch to the next, but also the cleaning expense during a product change is very high in these types of mixers.

The kneaders used with Z-arms also have only a limited mixing effect, which is why the homogeneity, the consistency, and the color of the chewing gum created can fluctuate from batch to batch. This leads not only to quality losses, but also has effects in the packaging machines that are subsequently connected. These machines require precise product properties and sizes, in order to obtain a level of efficiency of around 100%. When there are fluctuating product properties, the level of efficiency of the entire system can easily drop by up to 50%.

The long holding time in the mixer and the only limited mixing effect in spite of that, lead to either undesired loss of expensive flavoring agents by evaporation, etc. or to an increased requirement of these materials. In order to counteract this, the production must be monitored more closely so as to increase need for personnel.

The purpose of the invention presented here is thus to provide a device for making chewing gum, which avoids the disadvantages described above. In particular, it should be a better value and ensure a more uniform product quality.

BRIEF SUMMARY OF THE INVENTION

This purpose is achieved according to the invention in that the mixer provided is a high-speed shearing mixer that is flowed through in the axial direction, in which many ring-shaped stator parts are arranged on the inner wall of an essentially cylinder-shaped housing, said stator parts projecting radially to the inside and meshing with radial outside ends of rotating mixing blades while forming grinding gaps.

The advantage of the invention is that on the one hand, a continuous manufacture of chewing gum is possible with this mixer. Furthermore, the high-speed shearing mixer can also have a smaller total volume. As a result of that, small product entrainments are not to be expected between the individual batches, in particular because a high-speed shearing mixer of this type is also simple to clean. The machine also has only a smaller spatial requirement and since a more continuous process, which is possible with the device according to the invention, is easier to monitor, this also results in lower total personnel costs.

In an especially preferred embodiment form, the stator parts are also provided with teeth, so that the mixing can be done especially quickly and intensively.

It is proposed that the high-speed shearing mixer has a ratio of length to diameter (L/D) of $\leq 4$, which represents a small spatial requirement of a mixer of this type. A product holding time in the mixer of less than 30 sec. is also to be achieved, so that in total, a higher flow rate through the mixer is possible.

The high-speed shearing mixer according to the invention can also have a feed area connected upstream in the housing, in which the possible tangentially supplied basic substances are deflected in their flow into an axial direction and in which these basic substances can be pre-mixed and possibly preliminarily reduced.

So that the entire high-speed shearing mixer can be used for the intensive blending of the individual components of the chewing gum compound, it is proposed to provide a supply line in the feed area prior to the high-speed shearing mixer, through which the flavoring and/or coloring agents of the chewing gum compound are and/or sugar are added to the gum base.

In the device according to the invention, an additional temperature sensor is provided at the outlet of the high-speed shearing mixer. The measurement value of this temperature sensor is processed in a motor control. Via this motor control, the rotational speed of the high-speed shearing mixer is to be regulated, i.e. in particular the rotational speed of a rotor shaft, which carries the mixing blades rotating in the high-speed shearing mixer. Also, the drive output for the rotor shaft can be processed in the motor control, whereby for the rotational speed adjustment, preferably a frequency converter is used, with which the rotational speed of the drive motor is controlled. This drive motor preferably involves a three-phase current motor.

The necessary rotational speed of the rotor shaft is dependent on the product recipe, the particle size of the gum base and the output. Larger gum base particles require higher rotational speed than smaller particles, likewise the rotational speed increases proportionally with the output.

The high-speed shearing mixer described here operates for chewing gum depending on the recipe, size of the gum base particles and the output with Froude numbers that are between 18 and 400. This Froude number is determined in the process as follows:

$$Fr = v^2/(r \cdot g)$$

v=circumferential speed [m/sec]

r=radius of the mixing blades g [m]

g=acceleration due to gravity [m/seC2]

It has been discovered that with a device of this type, the chewing gum material in the high-speed shearing mixer may have temperatures in the range from 50 to 75° C., which is achieved by the dissipation of the drive energy in the product. Because of the short holding time mentioned above, this high temperature has no negative effects with regard to prejudices that have been published in the state of the art. Moreover, products generated with the device according to the invention have achieved better properties in regard to the homogeneity, their sensory (organoleptic) properties and also their handling capacity during packaging, than in the methods previously known in the prior art.

Also, the losses in odorous and flavoring agents are smaller than in the traditional processes, whereby in this context it has been proposed to connect a cooling device after the mixer in order to prevent undesired evaporation of these types of aromas from out of the chewing gum compound, which emerges warm from out of the high-speed shearing mixer.

A cooling device of this type can involve cooling rollers or even a cooled shaping extruder.

So that the device described can also have a constant output over longer time periods, it is proposed in addition to connect a controllable dosing device prior to the mixer, with which the solid components are continuously supplied. Also, the liquid additions such as flavoring and coloring agents are added via a controllable dosing device.

BRIEF DESCRIPTION OF THE SEVERAL VIEWS OF THE DRAWINGS

Additional advantages and characteristics of the invention are given in the following description of an embodiment example.

DETAILED DESCRIPTION OF THE INVENTION

Figure 1:
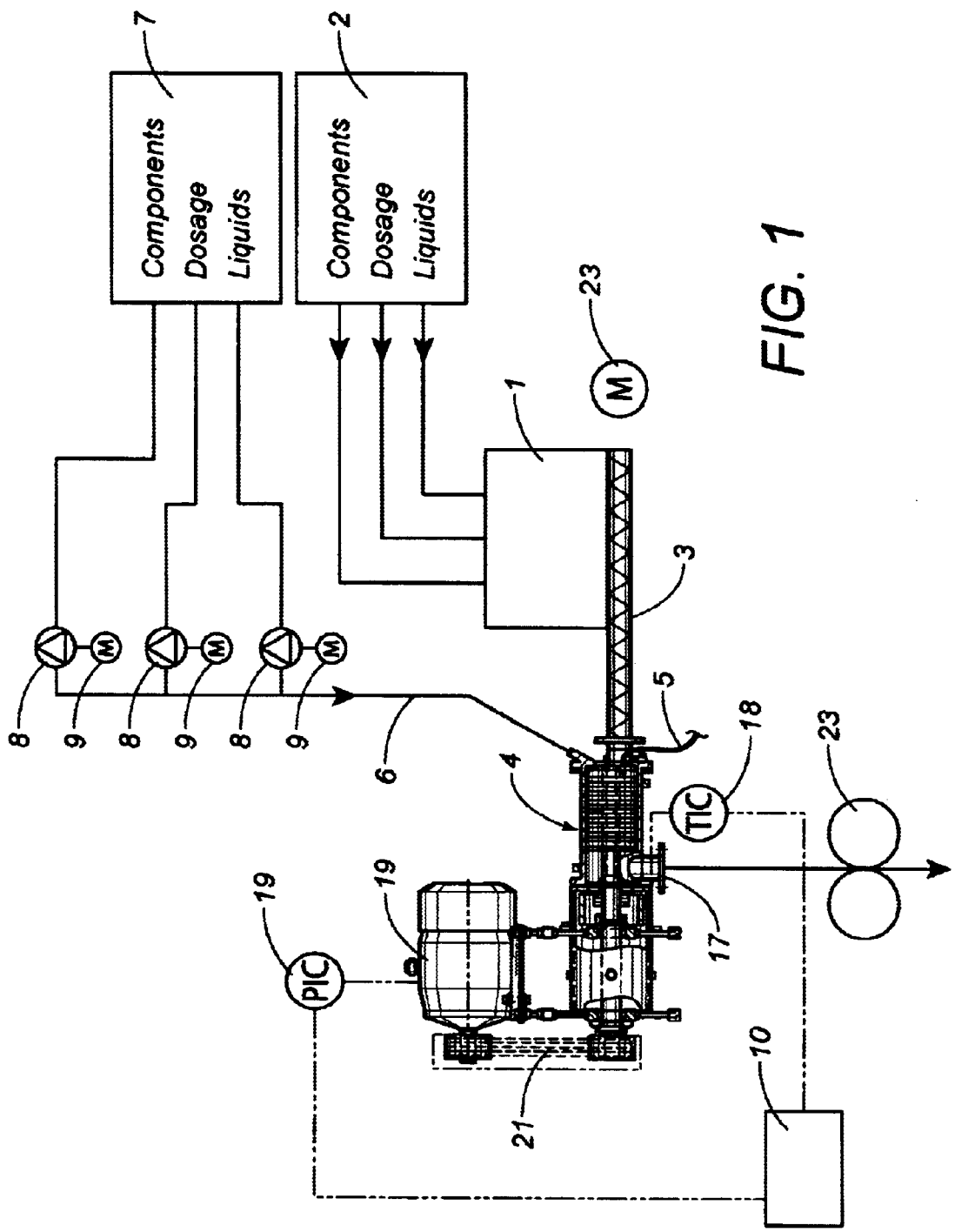
FIG. 1 is a schematic view of a device according to the invention.

In FIG. 1, there is shown a schematic diagram of a device according to the invention. Solids, which are to be dosed as components in a proper ratio to one another to manufacture the chewing gum, are mixed into a pre-mixing container I from out of a silo system 2, or the like. These solids involve a chewing gum base compound, the so-called gum base, sugar—and/or for sugar-free chewing gum, substitute substances such as manitol, sorbitol, or zylitol, etc.—lactose or possibly returned goods.

The product mixed into the preliminary mixing container I is supplied via a feed screw 3 to the high-speed shearing mixer 4 provided according to the invention.—The gum base must in the process be only coarsely preliminarily crushed, edge lengths of up to 30 mm are possible without problems in processing.

At the intake of the actual high-speed shearing mixer, the product runs through a feed area 5, where it is deflected by the flow into the proper direction and where the preliminary mixing and the preliminary reduction are conducted. In this feed area 5, an additional supply line 6 is provided, with which the liquids are added as mixing components to the mixed solid good. Components of this type such as flavoring agents, coloring agents, liquid glucose, etc. are usually let out of containers 7 via dosing pumps 8 into the supply line 6, whereby the dosing pumps are driven by controllable motors 9. The motors 9, as well as the motor 23 for the screw 3 are connected via lines not shown to a central control 10, which will be described later.

Figure 2:
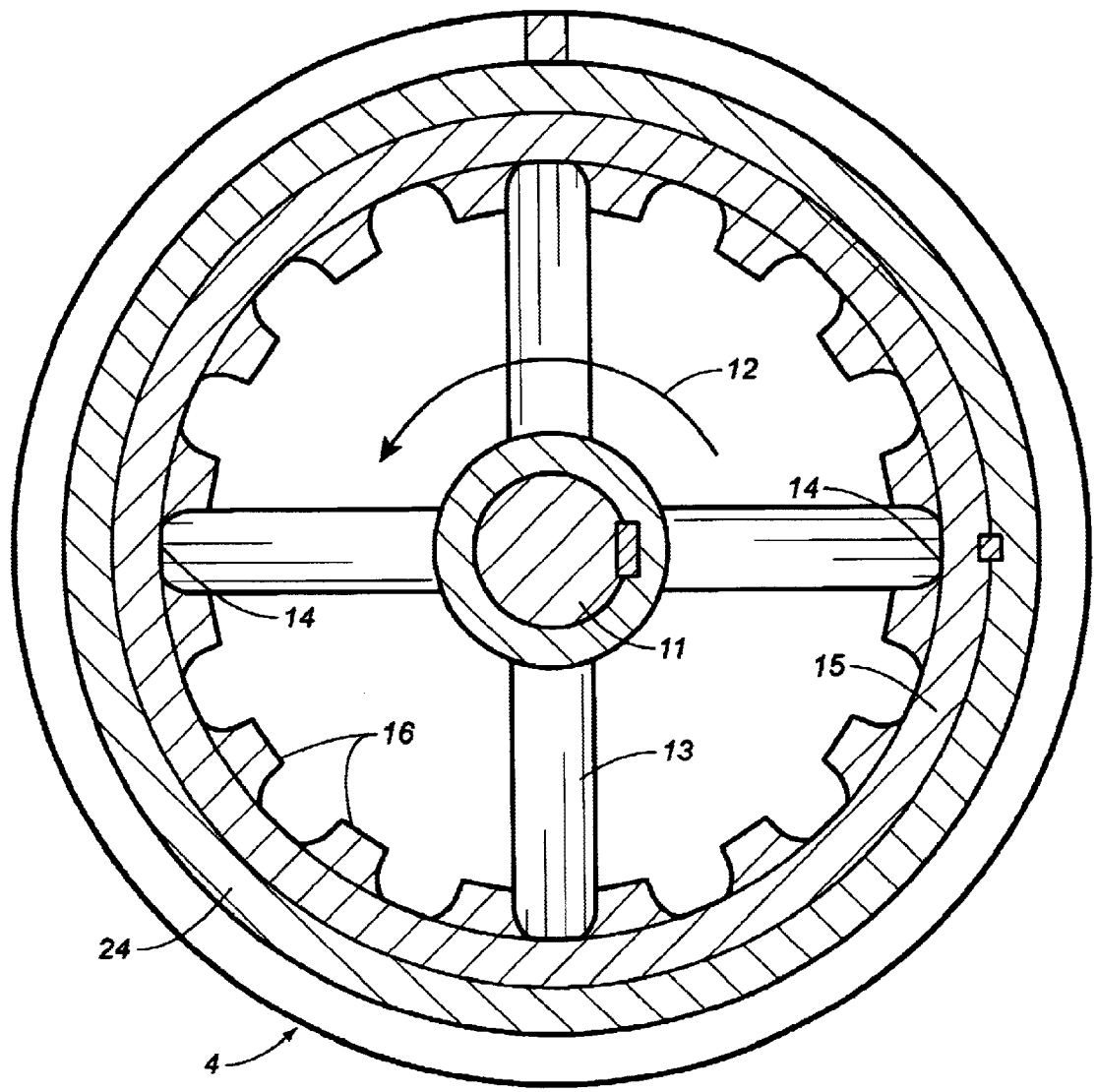
FIG. 2 is a sectional view of a high-speed shearing mixer, provided according to the invention, which is flowed through in the axial direction.

In the high-speed shearing mixer 4, which is shown in FIG. 2 in the sectional view, a rotor shaft 11 rotates according to the arrow 12 shown in FIG. 2 at a rotational speed, which is between 350–2000 min. Onto this rotor shaft 11, mixing blades 13 that run essentially in the radial direction are attached axially one after the other. These mixing blades 13 shear on their radially outside ends 14 with ring-shaped stator parts, which are arranged next to each other in the radial direction on the wall of a cylinder-shaped housing 24. Between the radial outside ends 14 of the mixing blades 13 and the ring-shaped stator parts 15, grinding gaps are formed. By these grinding gaps, the gum base introduced into the high-speed shearing mixer is mixed intensively with the other components. In this process, the length of the high-speed shearing mixer extending in the axial direction is smaller than the quadruple diameter of the high-speed shearing mixer, whereby the diameter of the high-speed shearing mixer is determined by the distance between the diametrically opposite, radial outside ends 14 of the mixing blades 13. This diameter is in customary designs between 200 and 300 mm, and rarely also at 400 mm.

It should also be mentioned here that the stator parts 15 extend radially to the inside and are provided with teeth 16 projecting radially to the inside in this area. This promotes the shearing action of the high-speed shearing mixer considerably. By this shearing action, the material located in the high-speed shearing mixer is heated and thus emerges from out of the mixer 4 after a holding time in the mixer of less than 30 sec. at an outlet opening 17 in the tangent direction. The temperature of the emerging material is detected via a temperature sensor 18 and processed via the control 10.

In the example shown here, the control 10 receives, moreover, via a corresponding measurement value sensor 19, additional measurement values via the drive output of the drive motor 20 designed as a three-phase current motor, whose output is transferred via the transmission 21 to the high-speed shearing mixer 4. By the corresponding controls, the control 10 can be used in order to set the machine optimally for different product qualities or different output rates.

Apart from the rotational speed of the drive motor 20, the control 10 also regulates the speed of the motor 23 for the screw 3, and thus the solid material supply to the high-speed shearing mixer 4, as well as the dosing pumps 8 via the motors 9, and thus the liquid supply to the high-speed shearing mixer 4.

As already mentioned, the outlet temperature is thus a significant quantity for each product quality, and it also can be adjusted via the drive energy dissipated in the mixed product through the high-speed shearing mixer. The outlet temperature in the embodiment form of the system described here can have values between 50 and 75° C.

The emerging compound is additionally cooled down to a customary processing temperature of approx. 45° C. via a cooling device 22 that is connected after the outlet opening 17, whereby this can involve in this cooling device a cooling roller or a cooled shaping extruder.

The invention thus involves in total an advantageous possibility for making chewing gum, since it makes possible short holding times in small machines with correspondingly low costs and spatial requirement, resulting in only low product and time losses when the recipe is changed or the system is cleaned. In particular, because of the small holding times, the most minimal losses in the odorous and flavoring substances can be achieved and also a high mixing quality with very high constancy. This in turn leads to correspondingly low losses in the subsequent packaging.

I claim:

1. A system for making chewing gum comprising:
   a shearing mixer means having an inlet communicating with an interior of a cylindrically-shaped housing, said housing having a plurality of ring-shaped stator elements projecting inwardly from an interior wall of said housing, respective pairs of said plurality of ring-shaped stator elements defining grinding gaps therebetween, said shearing mixer means having a rotor with mixing blades projecting radially outwardly therefrom, said mixing blades having radial outer ends meshing with said plurality of ring-shaped stator elements within said housing, said shearing mixer means for kneading and mixing a chewing gum base with flavoring or coloring agents and for shearing the mixed chewing gum base and flavoring or coloring agents in said grinding gaps; and
   a feeding means connected to said shearing mixer means for feeding the chewing gum base and the flavoring or coloring agents in an axial direction through said shearing mixer means.

2. The system of claim 1, each of said ring-shaped stator elements having teeth projecting inwardly therefrom.

3. The system of claim 1, said shearing mixer means having a length dimension extending from one end to an end thereof and a diameter dimension extending from a radial outer end of one of said mixing blades to an opposite radial outer end of an opposite one of said mixing blades, said length dimension being no more than four times said diameter dimension.

4. The system of claim 1, said feeding means comprising a feed area positioned upstream of said shearing mixer means.

5. The system of claim 4, said feeding means further comprising a supply line means opening to said feed area for passing the flavoring or coloring agents into said feed area.

6. The system of claim 1, said shearing mixer means having an outlet, the system further comprising:
   a temperature sensor means positioned adjacent said outlet for measuring a temperature of the sheared mixture passing through said outlet; and
   control means connected to said temperature sensor means and to said rotor of said shearing mixer means, said control means for controlling a rate of rotation of said rotor relative to a temperature value from said temperature sensor means.

7. The system of claim 6, further comprising:
   a drive output sensor means connected to said shearing mixer means and to said control means for transmitting a drive output value to said control means, said control means for controlling a rate of rotation of said rotor relative to the drive output value.

8. The system of claim 1, said shearing mixer means having an outlet further comprising:
   a cooling means connected to said outlet, said cooling means for cooling the sheared mixture passing through said outlet.

9. The system of claim 8, said cooling means comprising a cooling roller.

10. The system of claim 8, said cooling means comprising a cooled shaping extruder.

11. The system of claim 1, further comprising:
    a controllable dosing means connected upstream of said shearing mixer me for continuously supplying solid components of the chewing gum base to said feeding means.

* * * * *

UNITED STATES PATENT AND TRADEMARK OFFICE
CERTIFICATE OF CORRECTION

PATENT NO. : 6,672,754 B2
DATED : January 6, 2004
INVENTOR(S) : Eberhard, Lipp

It is certified that error appears in the above-identified patent and that said Letters Patent is hereby corrected as shown below:

<u>Title page,</u>
Item [30], after Foreign Application Priority Data, delete "Mar. 18, 2000" and insert -- May 18, 2000 --.

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,672,754 B2 Page 1 of 1
DATED : January 6, 2004
INVENTOR(S) : Lipp, Eberhard It is certified that error appears in the above-identified patent and that said Letters Patent is hereby corrected as shown below:

Drawings,
Sheet 1, Figure 1, in the text box of reference numeral 2, delete "Liquids" and insert -- Solids --
Sheet 1, Figure 1, in the lead line of reference numeral 5, delete the lead line for reference numeral 5 and use the attached substitute drawing of Figure 1.

Signed and Sealed this

Fourth Day of May, 2004

JON W. DUDAS
*Acting Director of the United States Patent and Trademark Office*